(12) United States Patent
Hwang et al.

(10) Patent No.: US 7,442,424 B2
(45) Date of Patent: Oct. 28, 2008

(54) INFORMATION STORAGE MEDIUM HAVING SUPER RESOLUTION STRUCTURE AND APPARATUS FOR RECORDING TO AND/OR REPRODUCING FROM THE SAME

(75) Inventors: In-oh Hwang, Seongnam-si (KR); Myong-do Ro, Yongin-si (KR); Joo-ho Kim, Yongin-si (KR); Hyun-ki Kim, Hwaseong-si (KR); Nak-hyun Kim, Suwon-si (KR); Chang-min Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 11/119,919

(22) Filed: May 3, 2005

(65) Prior Publication Data

US 2005/0254408 A1    Nov. 17, 2005

(30) Foreign Application Priority Data

May 17, 2004    (KR) ...................... 10-2004-0034905

(51) Int. Cl.
  *B32B 3/02*    (2006.01)
(52) U.S. Cl. .................... 428/64.4; 428/64.5; 428/64.6; 430/270.13
(58) Field of Classification Search ................ 428/64.4, 428/64.5; 430/270.12, 270.13
  See application file for complete search history.

(56) References Cited

U.S. PATENT DOCUMENTS

| | | | |
|---|---|---|---|
| 6,333,899 B1 | 12/2001 | Tamanoi et al. | |
| 6,411,591 B1 | 6/2002 | Moritani et al. | |
| 6,524,766 B1 * | 2/2003 | Ariyoshi et al. | 430/270.13 |
| 6,670,016 B1 * | 12/2003 | Kim et al. | 428/64.4 |
| 7,081,328 B2 * | 7/2006 | Todori et al. | 430/270.11 |
| 7,087,284 B2 * | 8/2006 | Kim et al. | 428/64.1 |
| 2003/0002428 A1 | 1/2003 | Cheong et al. | |
| 2004/0190432 A1 * | 9/2004 | Ichihara et al. | 369/275.1 |

FOREIGN PATENT DOCUMENTS

| | | |
|---|---|---|
| JP | 6-150418 | 5/1994 |
| JP | 06-274934 | 9/1994 |
| JP | 7-223372 | 8/1995 |
| JP | 2000-200448 | 7/2000 |
| KR | 1995-1651 | 1/1995 |
| WO | WO 2004/029936 * | 4/2004 |

OTHER PUBLICATIONS

Search Report and Written Opinion issued in International Patent Application No. PCT/KR2005/001418 on Aug. 24, 2005.
Office Action issued in Korean Patent Application No. 2004-34905 on Dec. 15, 2005.

* cited by examiner

*Primary Examiner*—Elizabeth Mulvaney
(74) *Attorney, Agent, or Firm*—Stein, McEwen & Bui, LLP (57) ABSTRACT

A super-resolution information storage medium having recording marks or pits that are smaller than the resolution limit of a beam incident from an information recording and/or reproducing apparatus, and the information recording and/or reproducing apparatus. The information storage medium includes a substrate and at least one super-resolution reproduction layer containing a super-resolution material and a high melting point material with a melting point higher than that of the super-resolution material formed on the substrate. The high melting point material suppresses movement of the super-resolution material in a melted phase so as to prevent signal degradation caused by repeated reproduction.

50 Claims, 5 Drawing Sheets

INFORMATION STORAGE MEDIUM HAVING SUPER RESOLUTION STRUCTURE AND APPARATUS FOR RECORDING TO AND/OR REPRODUCING FROM THE SAME

CROSS-REFERENCE TO RELATED APPLICATION

This application claims the benefit of Korean Application No. 2004-34905, filed May 17, 2004, in the Korean Intellectual Property Office, the disclosure of which is incorporated herein by reference.

BACKGROUND OF THE INVENTION

1. Field of the Invention

The present invention relates to an information storage medium having a super-resolution structure and an apparatus to record and/or reproduce the same, and, more particularly, to a super-resolution information storage medium designed to prevent degradation of a reproduction signal after repeated reproduction and an apparatus to record and/or reproduce from the same.

2. Description of the Related Art

An information recording and/or reproducing apparatus performs non-contact recording/reproducing to/from an information storage medium using an optical pickup. Since the demand for high density recording has increased, research has been conducted to develop a super-resolution information storage medium having recording marks or pits that are smaller than the resolution limit of a laser beam which uses a super-resolution phenomenon. Here, it is understood that when a wavelength of a laser of an optical pickup used is $\lambda$ and a numerical aperture of an objective lens is NA, the reproduction resolution limit is $\lambda/4NA$.

The super-resolution information storage medium has a super-resolution reproduction layer from which marks or pits that are smaller than the resolution limit of a reproducing beam are read using a super-resolution phenomenon. A laser beam focused onto an information storage medium has an approximately Gaussian intensity distribution. Thus, when the information storage medium is heated by the incident beam with the Gaussian intensity profile, a temperature distribution on a region on which a laser beam is irradiated also has an approximately Gaussian profile.

Therefore, the super-resolution reproduction layer has a high-temperature region near the center of a beam and a low-temperature region at the periphery of the beam. Reproduction of marks or pits smaller than the resolution limit may be realized by changing optical characteristics of a local region of the super-resolution reproduction layer, i.e., a super-resolution region.

Since the temperature increases toward the center of a laser beam spot, a portion of or the entire super-resolution region may melt. When the portion of or the entire super-resolution region melts, the melted super-resolution material floats away due to the rotation of an information storage medium or pressure from other layers. This effect may result in signal degradation after repeated reproduction operations.

SUMMARY OF THE INVENTION

The present invention provides a super-resolution information storage medium to prevent degradation of a reproduction signal due to melting or floating of a super-resolution reproduction layer. The present invention also provides an apparatus to record onto and/or reproduce from the same.

According to an aspect of the present invention, there is provided a super-resolution information storage medium which is designed to record and/or reproduce recording marks whose size is smaller than a resolution limit of a beam incident from an information recording and/or reproducing apparatus. The information storage medium includes a substrate and at least one super-resolution reproduction layer containing a super-resolution material and a high melting point material, the high melting point material having a melting point that is higher than that of the super-resolution material formed on the substrate.

The information storage medium may further include at least one recording layer having recording marks formed thereon formed on the substrate. It may further include at least one dielectric layer formed on the substrate.

The information storage medium may further include first through third dielectric layers and a recording layer formed on the substrate. The recording layer has recording marks recorded thereon, and the second dielectric layer is formed between the recording layer and the super-resolution reproduction layer.

The recording layer can be made of material that allows the recording marks to be recorded at least once. The recording layer may be made of a magneto-optical material, an organic material, an inorganic phase-change material that switches from one phase to another, an inorganic material from which two or more materials are combined, or an inorganic material that decomposes into two or more materials.

Pits are formed on at least one surface of the substrate facing the super-resolution reproduction layer. The information storage medium may further include a first dielectric layer formed between the pits on the substrate and the super-resolution reproduction layer and a second dielectric layer formed on the super-resolution reproduction layer.

The dielectric layer may be made of at least one material selected from the group consisting of silicon oxide ($SiO_x$), magnesium oxide ($MgO_x$), aluminum oxide ($AlO_x$), titanium oxide ($TiO_x$), vanadium oxide ($VO_x$), chrome oxide ($CrO_x$), nickel oxide ($NiO_x$), zirconium oxide ($ZrO_x$), germanium oxide ($GeO_x$), zinc oxide ($ZnO_x$), silicon nitride ($SiN_x$), aluminum nitride ($AlN_x$), titanium nitride ($TiN_x$), zirconium nitride (ZrNx), germanium nitride ($GeN_x$), silicon carbide (SiC), zinc sulfide (ZnS), a $ZnS$—$SiO_2$ compound, and magnesium difluoride ($MgF_2$).

The high melting point material may have a melting point that is sufficiently high such that the high melting point material is not melted by an incident reproducing beam.

The super-resolution material may contain a phase-change material. The super-resolution material may include a chalcogenide-based compound containing at least one of sulfur (S), selenium (Se), and tellurium (Te). The super-resolution material may include a material selected from the groups consisting of Se—S, Se—Te, S—Te, phosphorous (P)—S, P—Te, P—Se, arsenic (As)—S, As—Se, As—Te, antimony (Sb)—S, Sb—Se, Sb—Te, silicon (Si)—S, Si—Se, Si—Te, germanium (Ge)—S, Ge—Se, Ge—Te, tin (Sn)—S, Sn—Se, Sn—Te, Ag—S, silver (Ag)—Se, Ag—Te, aluminum (Al)—S, Al—Se, Al—Te, gallium (Ga)—S, Ga—Se, Ga—Te, indium (In)—S, In—Se, In—Te, and a compound containing at least one element in addition to the above compounds. The super-resolution material may include a compound containing Sb—Te and at least one of Ge, Ag, In, Sb, and Ga, such as Ge—Sb—Te or Ag—In—Sb—Te.

The high melting point material may include at least one compound selected from the group consisting of Al-oxygen (O), Al-nitrogen (N), Si—O, Si—N, Si—S, Si-carbon (C), titanium (Ti)—O, Ti—S, Ti—N, vanadium (V)—O, V—N, V-fluorine (F), chromium (Cr)—O, Cr—N, Cr—F, Cr—Se, Cr—Te, manganese (Mn)—O, Mn—F, Mn—S, Mn—Se, iron (Fe)—O, Fe—F, Fe—S, Fe—Te, cobalt (Co)—O, Co—F, Co—S, nickel (Ni)—O, Ni—F, Ni—S, Ni—Se, copper (Cu)—O, zinc (Zn)—O, Zn—S, Zn—Se, Zn—Te, Ga—O, Ga—F, Ga—S, Ga—Se, Ge—O, Ge—N, yttrium (Y)—O, Y—F, Y—S, zirconium (Zr)—O, Zr—N, Zr—F, Zr—S, palladium (Pd)—F, Pd—S, silver (Ag)—Te, Sn—O, hafnium (Hf)—O, Hf—N, Hf—F, tantalum (Ta)—N, technetium Ti—S, tungsten (W)—O, W—S, W—Te, iridium (Ir)—O, platinum (Pt)—Te, Pt—S, Pb—Se, Pb—Te, barium (B)—N, and a compound containing at least one element in addition to the above compounds.

The super-resolution reproduction layer may be made of a mixture of the high melting point material and the chalcogenide-based compound. The information storage medium may further include a cover layer disposed on a layer furthest away from the substrate.

According to another aspect of the present invention, there is provided an information recording and/or reproducing apparatus that records and/or reproduces information to and/or from the super-resolution information storage medium. The apparatus includes an optical pickup, which includes a light source that emits a beam onto the information storage medium and a photodetector that receives the beam reflected from the information storage medium, and a signal processor that produces an information reproduction signal and/or servo signals based on signals detected by the photodetector.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
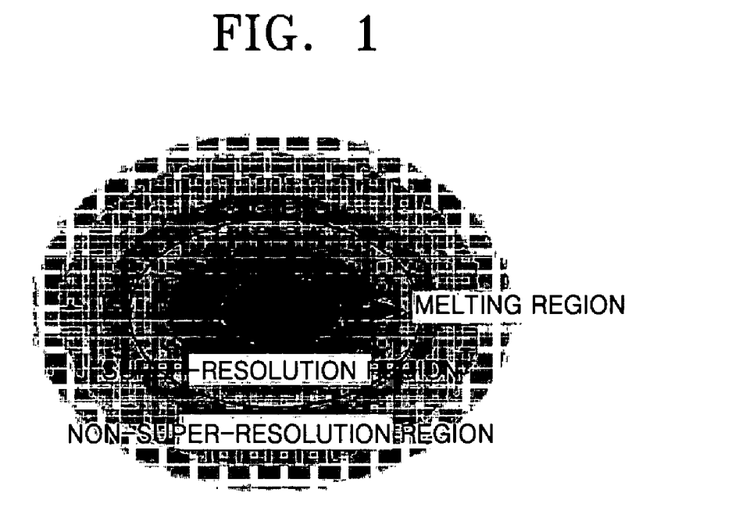
FIG. 1 is conceptual diagram illustrating a temperature distribution of an information storage medium according to the intensity distribution of a laser beam spot.

FIG. 1 shows an example of an information storage medium in which a part of super-resolution region contains a melting region as a conceptual diagram of a temperature distribution in a medium according to the intensity distribution of a laser beam spot. Specifically, since a temperature has a Gaussian distribution according to the intensity distribution of a laser beam spot focused onto a super-resolution reproduction layer, the temperature of the medium at the laser beam spot decreases away from the center of the laser beam spot at which the temperature is the highest. Thus, an area on the information storage medium on which a laser beam spot is irradiated includes a super-resolution region where a super-resolution phenomenon occurs and which corresponds to a central portion of a laser beam spot with a predetermined diameter and a non-super-resolution region which corresponds to a portion of the laser beam spot outside the predetermined diameter. The super-resolution region may contain a melting region. It is understood that the predetermined diameter of the super resolution region may be determined on a case-by-case basis and that the present invention is not limited to any particular diameter.

The present invention employs a super-resolution reproduction layer containing a material with a high melting point so as to prevent signal degradation after repeated reproduction that may occur when a super-resolution material, in a melted state, moves away from the original position due to the rotation of an information storage medium or a pressure from other layers. The use of the super-resolution reproduction layer containing the high melting point material suppresses movement of the super-resolution material so as to provide higher stability of an information storage medium after repeated reproduction operations.

Figure 2:
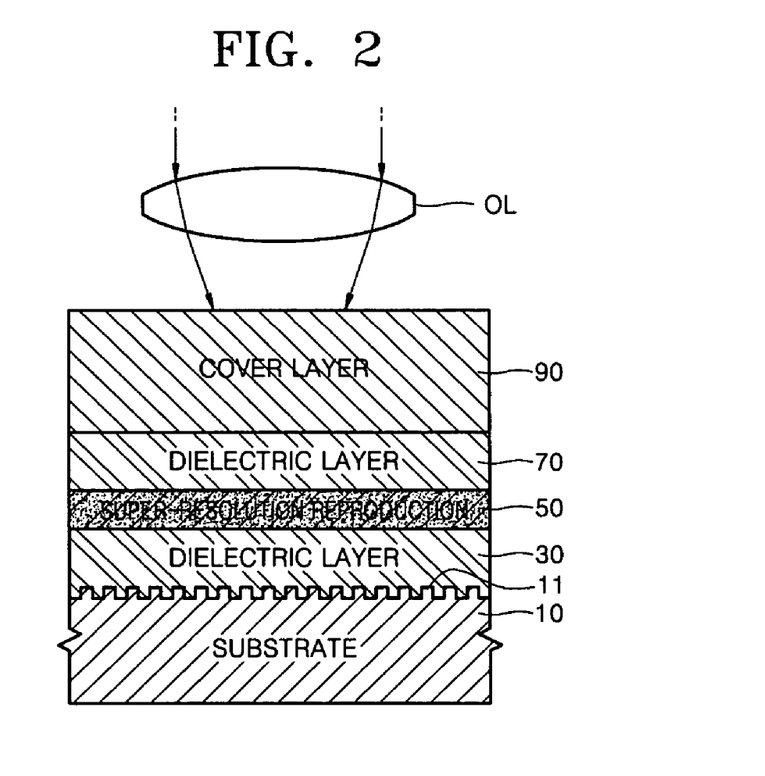
FIG. 2 is cross-sectional view of an information storage medium according to an embodiment of the present invention.

FIG. 2 is a cross-sectional view of an information storage medium according to an embodiment of the present invention.

Referring to FIG. 2, the information storage medium is designed to reproduce pits that are smaller than the resolution limit of a beam that is incident from an information recording and/or reproducing apparatus and includes at least one super-resolution reproduction layer 50.

The super-resolution reproduction layer 50 contains a super-resolution material and a material that has a higher melting point than the super-resolution material. The super-resolution material may be a basic material to form a typical super-resolution reproduction layer, such as a phase-change material in which optical characteristics of a super-resolution region corresponding to a central portion of an incident beam spot change.

More specifically, the super-resolution material may include a chalcogenide-based compound comprising at least one of sulfur (S), selenium (Se), and tellurium (Te) elements. For example, the super-resolution material may contain a compound selected from the groups consisting of Se—S, Se—Te, S—Te, phosphorous (P)—S, P—Te, P—Se, arsenic (As)—S, As—Se, As—Te, antimony (Sb)—S, Sb—Se, Sb—Te, silicon (Si)—S, Si—Se, Si—Te, germanium (Ge)—S, Ge—Se, Ge—Te, tin (Sn)—S, Sn—Se, Sn—Te, Ag—S, silver (Ag)—Se, Ag—Te, aluminum (Al)—S, Al—Se, Al—Te, gallium (Ga)—S, Ga—Se, Ga—Te, indium (In)—S, In—Se, In—Te, and a compound containing at least one element in addition to the above compounds. The super-resolution material may be a compound containing at least one of Ge, Ag, In, Sb, and Ga in addition to Sb—Te. For example, the super-resolution material may be Ge—Sb—Te or Ag—In—Sb—Te.

When the super-resolution material comprises a chalcogenide-based compound acting as a phase-change material, when the super-resolution reproduction layer 50 is irradiated with a laser beam spot, the super-resolution material contained in the super-resolution reproduction layer 50 changes from one crystalline phase to another at a temperature above a predetermined temperature. This causes a change in optical characteristics of a super-resolution region (i.e., the central portion of the laser beam spot) so as to allow a reproduction of pits (or recording marks) that are smaller than the resolution limit of the beam. In this case, the super-resolution reproduction layer 50 may comprise a mixture of the high melting point material and the chalcogenide-based compound.

In an embodiment of the invention, the high melting point material has a melting point that is sufficiently high such that the high melting point material will not be melted at least by the incident reproducing beam. A phase-change material such as a chalcogenide-based compound is used as the super-resolution material. The high melting point material may be at least one of Al-oxygen (O), Al-nitrogen (N), Si—O, Si—N, Si—S, Si-carbon (C), titanium (Ti)—O, Ti—S, Ti—N, vanadium (V)—O, V—N, V-fluorine (F), chromium (Cr)—O, Cr—N, Cr—F, Cr—Se, Cr—Te, manganese (Mn)—O, Mn—F, Mn—S, Mn—Se, iron (Fe)—O, Fe—F, Fe—S, Fe—Te, cobalt (Co)—O, Co—F, Co—S, nickel (Ni)—O, Ni—F, Ni—S, Ni—Se, copper (Cu)—O, zinc (Zn)—O, Zn—S, Zn—Se, Zn—Te, Ga—O, Ga—F, Ga—S, Ga—Se, Ge—O, Ge—N, yttrium (Y)—O, Y—F, Y—S, zirconium (Zr)—O, Zr—N, Zr—F, Zr—S, palladium (Pd)—F, Pd—S, silver (Ag)—Te, Sn—O, hafnium (Hf)—O, Hf—N, Hf—F, tantalum (Ta)—N, technetium Ti—S, tungsten (W)—O, W—S, W—Te, iridium (Ir)—O, platinum (Pt)—Te, Pt—S, Pb—Se, Pb—Te, and barium (B)—N, or a compound comprising at least one element in addition to the above compounds. For example, the high melting point material may be zinc sulfide (ZnS), silicon dioxide ($SiO_2$), or a compound containing ZnS and $SiO_2$.

When the super-resolution reproduction layer 50 contains only a Ge—Sb—Te alloy layer, which has a melting point of approximately 600° C. as the super-resolution reproduction layer, the super-resolution region corresponding to the central portion of the incident beam spot moves easily after being melted. On the other hand, when the super-resolution reproduction layer 50 contains ZnS—$SiO_2$ in addition to the Ge—Sb—Te alloy, ZnS and $SiO_2$ which have a high melting point of approximately 1,700° C., respectively, do not melt even when the Ge—Sb—Te alloy is melted, thus suppressing movement of the melted Ge—Sb—Te alloy.

As will become evident from a comparative example and an experimental example that will be described later, a carrier-to-noise ratio (CNR) significantly decreases due to repeated reproduction when the Ge—Sb—Te alloy layer is used. Conversely, when a mixture of Ge—Sb—Te and ZnS—$SiO_2$ is used, the CNR almost does not decrease. Thus, a use of the super-resolution reproduction layer 50 containing a material with a melting point that is sufficiently high, such that the material is not melted by at least an incident reproducing beam, may significantly improve repeated reproduction characteristics.

Referring to FIG. 2, the information storage medium is a read-only medium from which information is read using an apparatus employing a super-resolution phenomenon and includes a ROM substrate 10 having pits 11 formed on one surface, and a dielectric layer 30, the super-resolution reproduction layer 50, a dielectric layer 70 and a cover layer 90 sequentially formed on the pits 11. While FIG. 2 shows that the pits 11 are formed on one surface of the substrate 10, in an embodiment of the invention, the pits may be formed on two surfaces of the substrate 10.

The substrate 10 may be made of a material selected from the group consisting of polycarbonate, polymethyl methacrylate (PMMA), amorphous polyolefin (APO), and glass. The pits 11 formed on the substrate 10 are smaller than the resolution limit of a reproducing beam.

A reflective coating may be formed on the pits 11 engraved in the substrate 10. The reflective coating may be made of Si, Al, Ag, gold (Au), copper (Cu), Pt, or an alloy containing at least one of these.

The dielectric layers 30 and 70 control optical and/or thermal characteristics and may each be made of at least one of oxide, nitride, carbide, and fluoride. That is, the dielectric layers 30 and 70 may each be made of at least one material selected from the group consisting of silicon oxide ($SiO_x$), magnesium oxide ($MgO_x$), aluminum oxide ($AlO_x$), titanium oxide ($TiO_x$), vanadium oxide ($VO_x$), chrome oxide ($CrO_x$), nickel oxide ($NiO_x$), zirconium oxide ($ZrO_x$), germanium oxide ($GeO_x$), zinc oxide ($ZnO_x$), silicon nitride ($SiN_x$), aluminum nitride ($AlN_x$), titanium nitride ($TiN_x$), zirconium nitride (ZrNx), germanium nitride ($GeN_x$), silicon carbide (SiC), zinc sulfide (ZnS), a ZnS—$SiO_2$ compound, and magnesium difluoride ($MgF_2$).

The cover layer 90 protects layers formed on the substrate 10 including the super-resolution reproduction layer 50 and is formed by spin coating a resin to a thickness of 0.1 mm.

A reproducing beam used to reproduce information from the information storage medium according to an embodiment of the present embodiment, which is a read-only medium, is focused by an objective lens OL and is incident through the cover layer 90. When the incident beam passes through the cover layer 90 and the super-resolution reproduction layer 50 and reaches the pits 11 formed on the surface of the substrate 10, the pits 11, which are smaller than the resolution limit of the incident reproducing beam, are reproduced.

Figure 3:
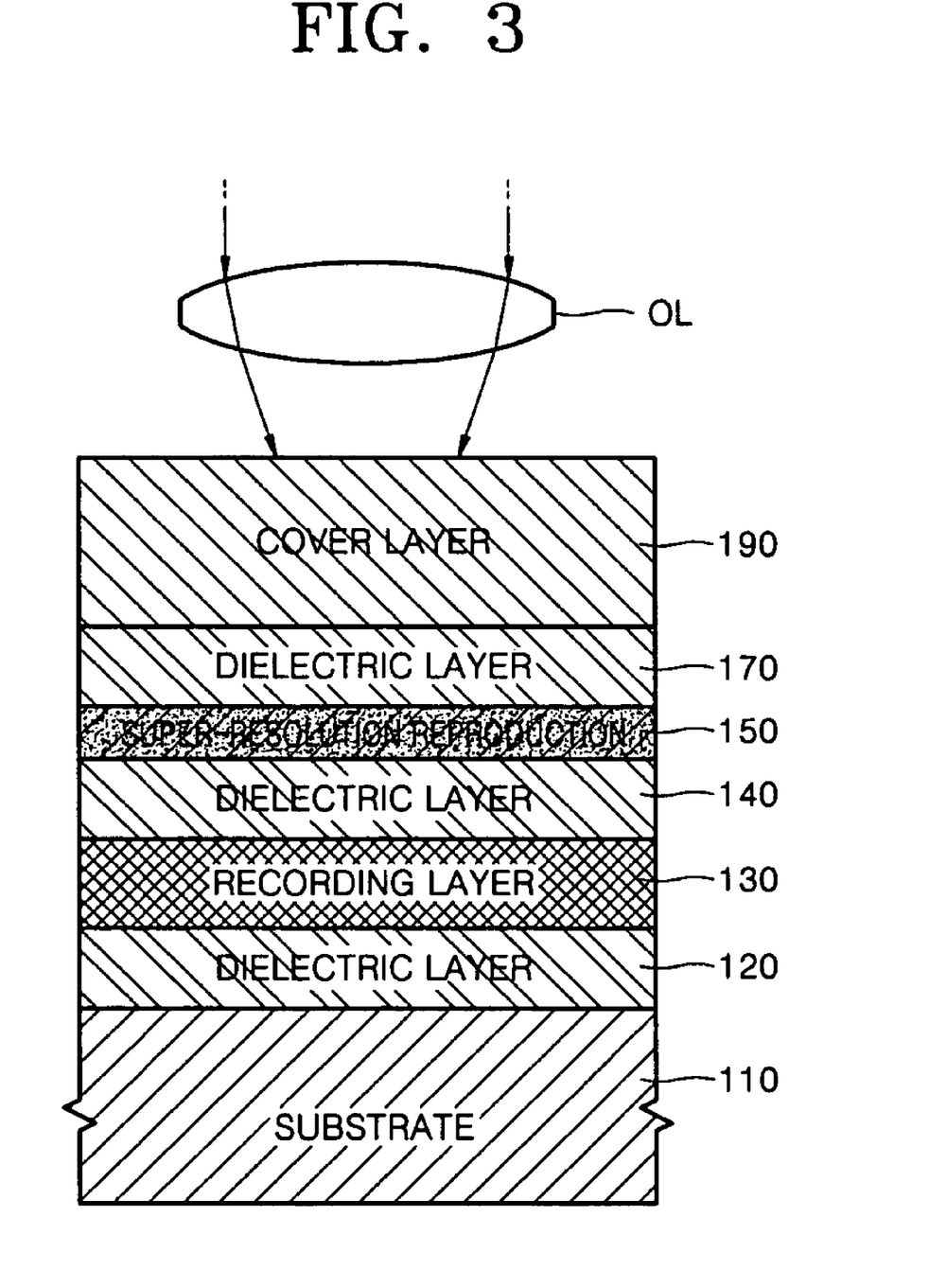
FIG. 3 is a cross-sectional view of an information storage medium according to another embodiment of the present invention.

FIG. 3 is a cross-sectional view of an information storage medium according to another embodiment of the present invention. Referring to FIG. 3, the information storage medium is designed to reproduce recording marks smaller than the resolution limit of a beam that is incident from an information recording and/or reproducing apparatus. The information storage medium includes a substrate 110, and a dielectric layer 120, a recording layer 130, a dielectric layer 140, a super-resolution reproduction layer 150, a dielectric layer 170 and a cover layer 190 sequentially formed on the substrate 110.

Information is recorded in the recording layer 130. Recording marks recorded on the recording layer 130 may be smaller than the resolution limit of an incident reproducing beam. The recording layer 130 may comprise a magneto-optical, organic, or inorganic material. Inorganic materials capable of being used in the recording layer 130 are classified into three groups: (1) a phase-change material that switches from one phase to another, (2) a material into which two or more materials are combined during a recording process, and (3) a material that decomposes into two or more materials during a recording process. The magneto-optical recording material is material that information can be read and recorded using a magneto-optical mechanism. The organic material changes reflectance in response to a beam with a predetermined power. The phase-change material has a crystalline or non-crystalline phase depending on the power of an incident beam and cooling speed. By forming the recording layer 130 from the magneto-optical or phase-change material, realizing a rewritable type information storage medium that may be repeatedly recorded on and reproduced from is possible.

The material into which two or more materials are combined during a recording process, i.e., a reactive material, may include two of Si, V, Cr, Co, Ni, Cu, Ge, Se, niobium (Nb), molybdenum (Mo), Ag, Sn, Sb, Te, Ti, Zr, W, elements in the lanthanide series of the periodic table such as lanthan (La) and cerium (Ce), and a material containing at least one different element in addition to each of the above elements. For example, the reactive material may include W and Si. When the recording layer 130 is formed from a mixture of W and Si as a single layer or the two elements as a dual layer, an incident recording beam causes the W and Si to chemically react with each other so as to form a recording mark from a W—Si compound.

A recording laser beam in the material that decomposes into two or more materials (i.e., a volume change material) forms a recording mark by changing the volume of the material. The volume change material may be $PtO_x$ that decomposes into Pt and $O_2$ during a recording process and has a recording mark with an elliptical bubble structure.

By forming the recording layer 130 from the organic material, the material into which two or more materials are combined during a recording process, or the material that decomposes into two or more materials during a recording process, realizing a write once read many (WORM) type medium that may be written to just once but read from many times is possible.

The use of the recording layer 130 allows the information storage medium according to another embodiment of the present invention to be written to at least once and allows recording marks that are smaller than the resolution limit of the laser beam, which is focused by the objective lens OL and incident through the cover layer 190, to be read.

A reflective coating may be made of the material described above and formed on a surface of the substrate 110 to oppose the super-resolution reproduction layer 150. Since the materials, structures, and functions of the substrate 110, the dielectric layers 120, 140, and 170, the super-resolution reproduction layer 150, and the cover layer 190 are substantially similar to those of the counterparts in the previously described embodiment, detailed descriptions thereof will not be given.

While the information storage medium illustrated in FIG. 3 includes a single recording layer 130, the information storage medium may further include a plurality of recording layers. That is, the information storage medium according to the present invention may include a single or a plurality of recording layers.

Although the super-resolution reproduction layer 150 is located above the recording layer 130 with respect to the incident recording and/or reproducing laser beam, such that the incident recording and/or reproducing laser beam penetrates the super-resolution reproduction layer 150 before the recording layer 130, as shown in FIG. 3, the recording layer 130 and the super-resolution reproduction layer 150 may be arranged in the reverse order since the recording layer 130 and the super-resolution reproduction layer 150 are thin enough to be located within the depth of focus. That is, the recording layer 130 may be located before the super-resolution reproduction layer 150.

While the information storage medium illustrated in FIG. 3 includes a single super-resolution reproduction layer 150 for a single recording layer 130 or a recording pit, the information storage medium may further include a plurality of super-resolution layers.

Meanwhile, in FIGS. 2 and 3, laser beams are shown as being incident on the cover layers 90 and 190 of the information storage media, which are the furthest layers from the substrates 10 and 110, respectively, like in a BLU-ray disc (BD). The substrates 10 and 110 may have thicknesses equal or similar to that of a BD substrate so as to achieve compatibility with other various storage media. The information storage medium, according to the present invention, may be designed to use a laser beam incident through the substrate 10 or 110, like in a design for a digital versatile disc (DVD).

Figure 4:
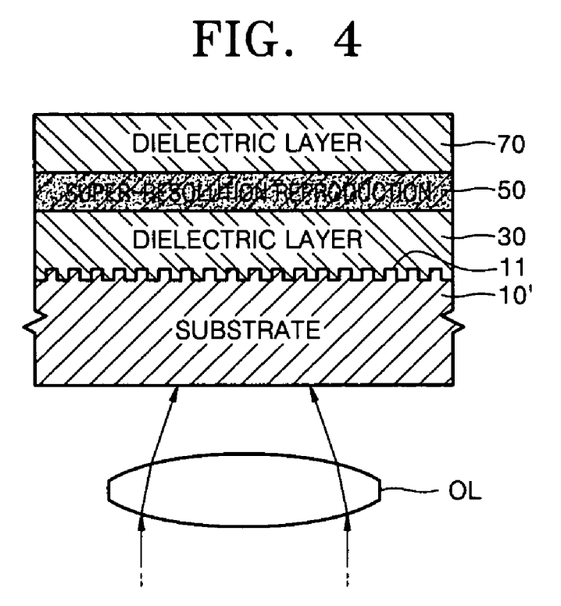
FIGS. 4 and 5 illustrate information storage media corresponding to embodiments of the present invention and using incident light beam through one surface of a substrate thereof.
Figure 5:
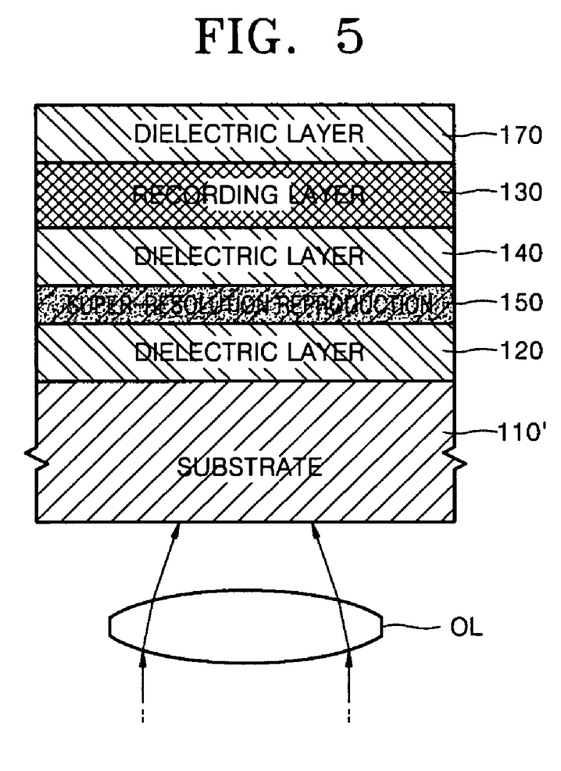

FIGS. 4 and 5 show embodiments of information storage media designed to use a laser beam that is incident through substrates in comparison with the embodiments of FIGS. 2 and 3. Since the materials, structures, and operations of the respective layers shown in FIGS. 4 and 5 are substantially the same as those of the counterparts shown in FIGS. 2 and 3, respectively, detailed descriptions thereof will not be given.

The information storage medium shown in FIG. 4 differs from the information storage medium shown in FIG. 2 in that a laser beam is illustrated as being incident through one side of a substrate 10'. For example, the substrate 10' may have a thickness equal or similar to a DVD substrate to achieve compatibility with other various storage media. Meanwhile, since an objective lens OL is disposed nearest to the substrate 10', as opposed to the objective lens OL shown in FIG. 2, a cover layer is omitted. A cover layer may be absent or present on the dielectric layer 70.

The information storage medium of FIG. 5 differs from the information storage medium shown in FIG. 3 in that the recording layer 130 and the super-resolution reproduction layer 150 are arranged in the reverse order and a laser beam is incident through one side of a substrate 110'. For example, the substrate 110' may have a thickness equal or similar to a DVD substrate so as to achieve compatibility with other various storage media. In FIG. 5, while the super-resolution reproduction layer 150 is located before the recording layer 130 with respect to the incident laser beam, the layers may be arranged in the reverse order. Meanwhile, in FIG. 5, since an objective lens OL is disposed nearest the substrate 10', as opposed to the objective lens OL shown in FIG. 3, a cover layer is omitted. A cover layer may be absent or present on the dielectric layer 70.

In the information storage media using laser beams that are incident through the substrates 10' and 110', reflective coatings may be formed on the dielectric layers 70 and 170, which are farthest away from the substrates '10'and '110', respectively. When the information storage media shown in FIGS. 4 and 5 include cover layers, the reflective coatings may be formed on the cover layers.

As is described above, an improvement in reproduction stability may be achieved by preventing the movement of the super-resolution material when the super-resolution reproduction layer 50 or 150 contains a material with a melting point higher than that of a super-resolution material. This improvement will now be proved through comparison between a typical information storage medium having a typical super-resolution reproduction layer and an information storage medium according to an embodiment of the present invention.

Figure 6:
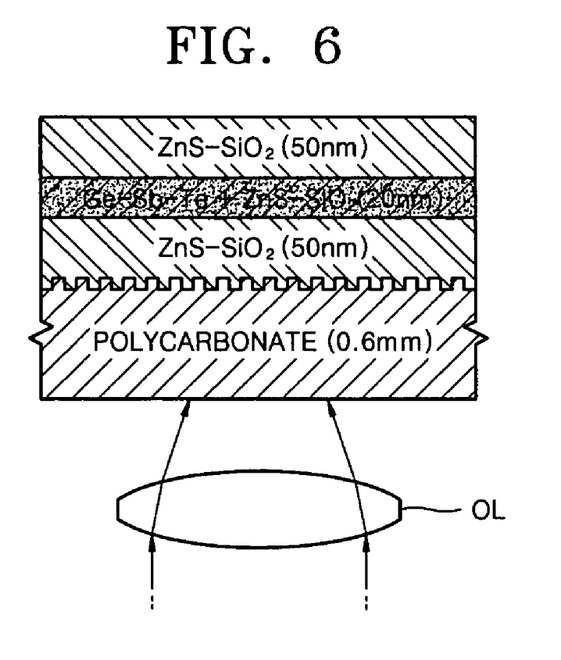
FIG. 6 is a cross-sectional view of an information storage medium used to examine variation of repeated reproduction property in an information storage medium, according to an illustrative embodiment of the present invention.

FIG. 6 is a cross-sectional view of an information storage medium according to an illustrative embodiment of the present invention. Referring to FIG. 6, the information storage medium includes a 0.6 mm thick polycarbonate ROM substrate having pits with a length of 150 nm, a depth of 50 nm, and a track pitch of 0.74 µm, and a 50 nm thick ZnS—SiO$_2$ dielectric layer, a 20 nm thick super-resolution reproduction layer made of Ge—Sb—Te (super-resolution material) and ZnS—SiO$_2$ (high melting point material) and a 50 nm thick ZnS—SiO$_2$ dielectric layer, sequentially formed on the polycarbonate ROM substrate by a sputtering process.

In the illustrative embodiment, Ge—Sb—Te and ZnS—SiO$_2$ are formed by co-sputtering and the volume ratio of Ge—Sb—Te to ZnS—SiO$_2$ is 1 to 1. The percent composition of Ge—Sb—Te is 6.5:72.5:21.0 based on atomic percent (at %), and the ratio of ZnS to SiO$_2$ is 80 to 20 based on mol percent (mol %).

Figure 7:
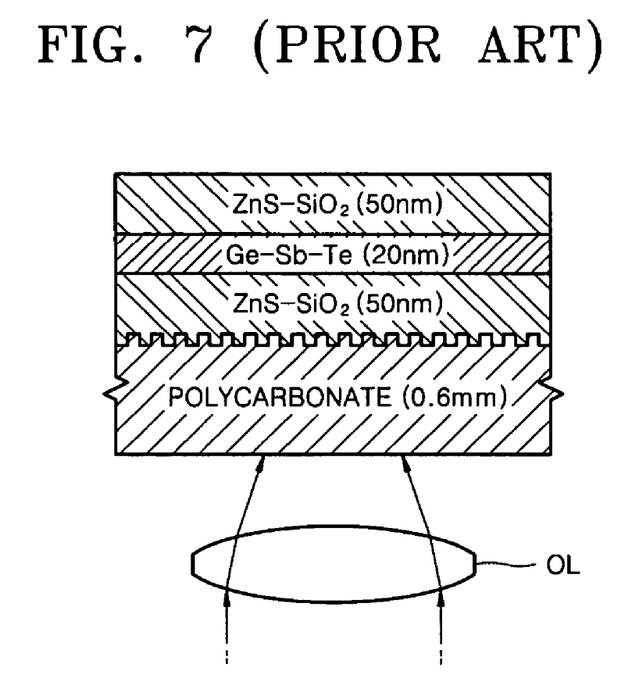
FIG. 7 is a cross-sectional view of a comparison information storage medium used as a comparison sample.

FIG. 7 is a cross-sectional view of a comparison information storage medium according to a comparative example. Referring to FIG. 7, the comparison information storage medium includes a 0.6 mm polycarbonate ROM substrate having pits with a length of 150 nm, a depth of 50 nm, and a track pitch of 0.74 µm, and a 50 nm thick ZnS—SiO$_2$ dielectric layer, a 20 nm thick super-resolution reproduction layer made of Ge—Sb—Te (super-resolution material) and a 50 nm thick ZnS—SiO$_2$ dielectric layer sequentially formed on the polycarbonate ROM substrate by a sputtering process.

The information storage medium according to the illustrative embodiment is substantially identical to the comparison information storage medium according to a comparative example except that the super-resolution reproduction layer further contains a high melting point material ZnS—SiO$_2$.

The information storage media shown in FIGS. 6 and 7 use a laser beam incident through the substrates and have a substantially similar substrate thickness and track pitch as those of a DVD disc.

The information storage medium according to the illustrative embodiment of the present invention and the comparison information storage medium according to the comparative example were reproduced at a constant linear velocity of 3 m/s and with a reproducing power of 1.8 mW using an optical pickup with a laser having a wavelength of 650 nm and an objective lens with a numerical aperture (NA) of 0.60. In this case, the reproduction resolution limit was found to be 271 nm, which is larger than the 150 nm pits.

Figure 8:
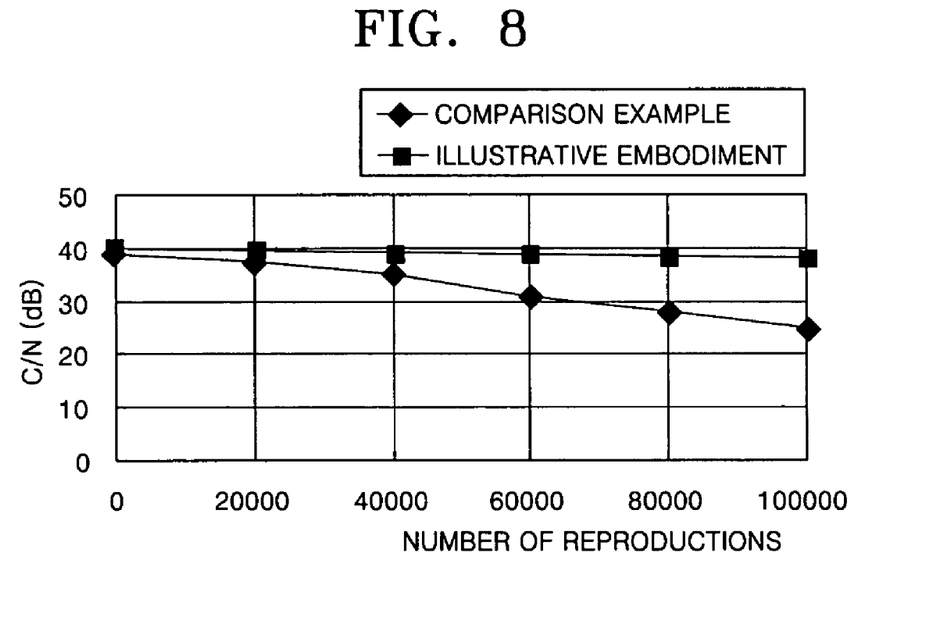
FIG. 8 illustrates carrier-to-noise ratio (CNR) with respect to the number of repeated reproductions in the information storage media shown in FIGS. 6 and 7, respectively.

FIG. 8 illustrates variation of a carrier-to-noise ration (CNR) with respect to the number of repeated reproductions from the information storage medium according to the illustrative embodiment of the present invention and the information storage medium according to the comparative example shown in FIGS. 6 and 7, respectively. Referring to FIG. 8, the CNR significantly decreases as the number of repeated reproductions increases for the comparison information storage medium according to the comparative example using the Ge—Sb—Te layer, whereas the CNR remains almost constant in the information storage medium using a mixture of Ge—Sb—Te and ZnS—SiO$_2$ according to the illustrative embodiment although the number of repeated reproductions increases. Thus, in contrast to the conventional art, CNR degradation is significantly improved in the illustrative embodiment.

That is, for example, when reproductions were repeated about 100,000 times, the CNR decreased from an initial value by more than 15 dB for the information storage medium according to the comparative example, whereas the CNR only slightly decreased from an initial value by about 1 dB in the information storage medium according to the illustrative embodiment.

As is described above, when the super-resolution reproduction layer contains only a Ge—Sb—Te layer having a melting point of approximately 600° C., the Ge—Sb—Te layer tends to move easily after being melted in a super-resolution region. On the other hand, when the super-resolution reproduction layer contains ZnS—SiO$_2$ in addition to the Ge—Sb—Te layer, ZnS and SiO$_2$, each having a relatively high melting point of approximately 1,700° C., does not melt even when the Ge—Sb—Te layer is melted so as to suppress movement of the melted Ge—Sb—Te layer.

Figure 9:
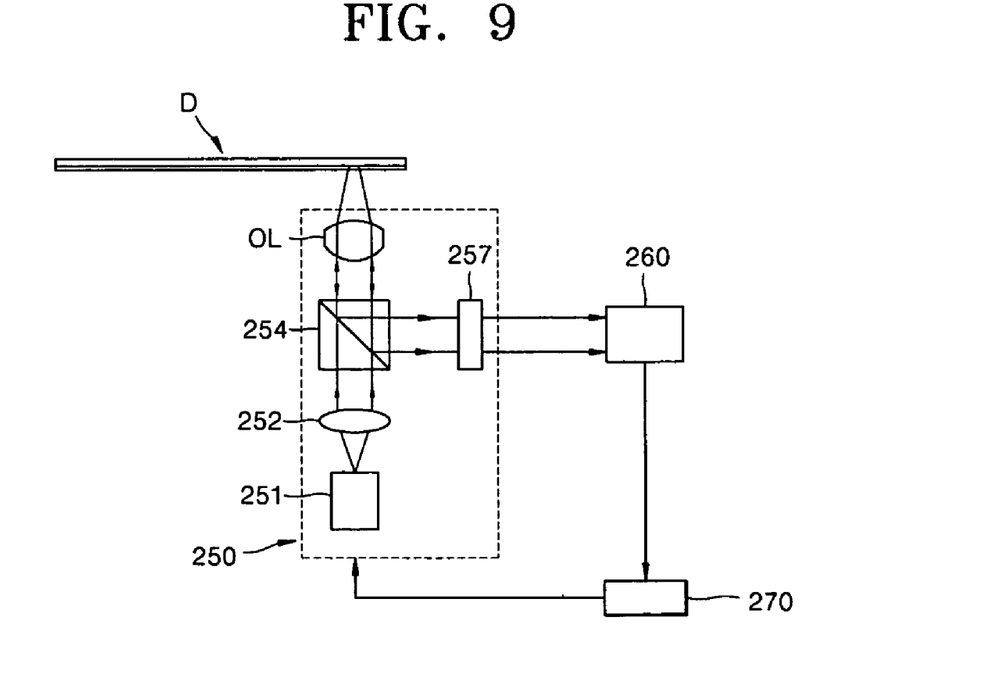
FIG. 9 is a schematic diagram of an apparatus to record to and/or reproduce from a super-resolution information storage medium according to an embodiment of the present invention.

FIG. 9 is a schematic diagram of an optical recording and/or reproducing apparatus to record to and/or reproduce from a super-resolution information storage medium according to an embodiment of the present invention. Referring to FIG. 9, the optical recording and/or reproducing apparatus includes an optical pickup 250 that moves along a radial direction of an information storage medium D and reproduces information and/or records information from and/or to the information storage medium D. The apparatus also includes a signal processor 260 and a controller 270. The information storage medium D is rotated by a spindle motor.

The optical pickup 250 includes a laser diode 251 that emits a beam, a collimating lens 252 that collimates the beam emitted by the laser diode 251 into a parallel beam, a beam splitter 254 that changes the propagation path of the beam, and an objective lens OL that focuses the beam passing through the beam splitter 254 onto the information storage medium D. Further, the optical pickup 250 may have additional various optical configurations known in the art depending on the type of application. Therefore, it is understood that the present invention is not limited to any one optical configuration.

A beam reflected from the information storage medium D is reflected by the beam splitter 254 and is then received by a photodetector 257. The photodetector may be, for example, a quadrant photodetector. The received beam is photoelectrically converted into an electrical signal. The signal processor 250 produces an information reproduction signal (RF signal) and servo signals (focus servo, tracking servo, and/or tilt servo signals). The controller 270 controls the rotation speed of the spindle motor through a driver (not shown), drives the optical pickup 250, and controls the servo operation of the optical pickup 250 using the servo signals produced by the signal processor 260.

Since the information storage medium D is a super-resolution information storage medium with recording marks or pits that are smaller than the resolution limit of an incident laser beam, the information recording and/or reproducing apparatus may realize the reproduction of recording marks or pits recorded on the information storage medium D under the resolution limit less than that of a laser beam incident from an optical system in the optical pickup 250. Even though the information recording and/or reproducing apparatus repeatedly reproduces the super-resolution information storage medium D, a reproduction signal suffers little degradation.

Since the super-resolution reproduction layer contains a high melting point material with a melting point that is sufficiently high such that the high melting point material is not melted at least by a reproducing laser beam, the high melting point material suppresses movement of the super-resolution material in a melted phase so as to prevent signal degradation caused by repeated reproduction.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A super-resolution information storage medium which is designed to record and/or reproduce recording marks that are smaller than a resolution limit of a beam incident from an information recording and/or reproducing apparatus, the information storage medium comprising:
    a substrate; and
    at least one super-resolution reproduction layer containing a super-resolution material comprising a chalcogenide-based compound and a high melting point material, the high melting point material having a melting point that is approximately 1,100° C. higher than that of the super-resolution material formed on the substrate.

2. The information storage medium of claim 1, further comprising at least one recording layer having recording marks recorded thereon formed on the substrate.

3. The information storage medium of claim 1, further comprising at least one dielectric layer formed on the substrate.

4. The information storage medium of claim 3, wherein the dielectric layer is made of at least one material selected from the group consisting of silicon oxide ($SiO_x$), magnesium oxide ($MgO_x$), aluminum oxide ($AlO_x$), titanium oxide ($TiO_x$), vanadium oxide ($VO_x$), chrome oxide ($CrO_x$), nickel oxide ($NiO_x$), zirconium oxide ($ZrO_x$), germanium oxide ($GeO_x$), zinc oxide ($ZnO_x$), silicon nitride ($SiN_x$), aluminum nitride ($AlN_x$), titanium nitride ($TiN_x$), zirconium nitride ($ZrN_x$), germanium nitride ($GeN_x$), silicon carbide (SiC), zinc sulfide (ZnS), a $ZnS$—$SiO_2$ compound, and magnesium difluoride ($MgF_2$).

5. The information storage medium of claim 1, further comprising first through third dielectric layers and a recording layer formed on the substrate, the recording layer having recording marks recorded thereon.

6. The information storage medium of claim 5, wherein the second dielectric layer is formed between the recording layer and the super-resolution reproduction layer.

7. The information storage medium of claim 6, wherein each dielectric layer is made of at least one material selected from the group consisting of silicon oxide ($SiO_x$), magnesium oxide ($MgO_x$), aluminum oxide ($AlO_x$), titanium oxide ($TiO_x$), vanadium oxide ($VO_x$), chrome oxide ($CrO_x$), nickel oxide ($NiO_x$), zirconium oxide ($ZrO_x$), germanium oxide ($GeO_x$), zinc oxide ($ZnO_x$), silicon nitride ($SiN_x$), aluminum nitride ($AlN_x$), titanium nitride ($TiN_x$), zirconium nitride ($ZrN_x$), germanium nitride ($GeN_x$), silicon carbide (SiC), zinc sulfide (ZnS), a $ZnS$—$SiO_2$ compound, and magnesium difluoride ($MgF_2$).

8. The information storage medium of claim 6, wherein the recording layer is made of a material that allows the recording marks to be written at least once.

9. The information storage medium of claim 8, wherein the recording layer is made of a material selected from the group consisting of a magneto-optical material, an organic material, an inorganic phase-change material that switches from one phase to another, an inorganic material into which two or more materials are combined, and an inorganic material that decomposes into two or more materials.

10. The information storage medium of claim 2, wherein the recording layer is made of a material that allows the recording marks to be recorded at least once.

11. The information storage medium of claim 10, wherein the recording layer is made of a material selected from the group consisting of a magneto-optical material, an organic material, an inorganic phase-change material that switches from one phase to another, an inorganic material from which two or more materials are combined, and an inorganic material that decomposes into two or more materials.

12. The information storage medium of claim 1, wherein pits are formed on at least one surface of the substrate facing the super-resolution reproduction layer.

13. The information storage medium of claim 12, further comprising:
    a first dielectric layer formed between the pits on the substrate and the super-resolution reproduction layer; and
    a second dielectric layer formed on the super-resolution reproduction layer.

14. The information storage medium of claim 12, wherein the dielectric layer is made of at least one material selected from the group consisting of silicon oxide ($SiO_x$), magnesium oxide ($MgO_x$), aluminum oxide ($AlO_x$), titanium oxide ($TiO_x$), vanadium oxide ($VO_x$), chrome oxide ($CrO_x$), nickel oxide ($NiO_x$), zirconium oxide ($ZrO_x$), germanium oxide ($GeO_x$), zinc oxide ($ZnO_x$), silicon nitride ($SiN_x$), aluminum nitride ($AlN_x$), titanium nitride ($TiN_x$), zirconium nitride ($ZrN_x$), germanium nitride ($GeN_x$), silicon carbide (SiC), zinc sulfide (ZnS), a $ZnS$—$SiO_2$ compound, and magnesium difluoride ($MgF_2$).

15. The information storage medium of claim 1, wherein the high melting point material has a melting point that is sufficiently high such that the high melting point material is not melted by an incident reproducing beam.

16. The information storage medium of claim 1, wherein the super-resolution material comprises a phase-change material.

17. The information storage medium of claim 16, wherein the chalcogenide-based compound contains sulfur.

18. The information storage medium of claim 17, wherein the super-resolution material comprises Ge—Sb—Te.

19. The information storage medium of claim 17, wherein the high melting point comprises $ZnS$—$SiO_2$.

20. The information storage medium of claim 16, wherein the high melting point material comprises $ZnS$—$SiO_2$.

21. The information storage medium of claim 17, wherein the super-resolution reproduction layer is made of a mixture of the high melting point material and the chalcogenide-based compound.

22. The information storage medium of claim 1, further comprising a cover layer disposed on a furthest layer from the substrate.

23. A super-resolution information storage medium to be used with an information recording and/or reproducing apparatus from which an incident beam having a resolution limit is irradiated, the medium comprising:
    a read-only-memory (ROM) having a surface on which reproducing pits that are smaller than the resolution limit of the incident beam are formed;
    a first dielectric layer formed adjacent to the surface on which the reproducing pits are formed;
    a super-resolution reproduction layer adjacent to the first dielectric layer and containing a combination of a super-resolution material and a high melting point material, the high melting point material having a higher melting point which is approximately 1,100° C. higher than the super-resolution material;
    a second dielectric layer formed adjacent to the super-resolution layer; and
    a cover layer to protect the surface on which the reproducing pits are formed, the super-resolution reproduction layer, and the first and second dielectric layers.

24. The medium according to claim 23, wherein the super-resolution material comprises a phase-change material in which optical characteristics of a super-resolution region change.

25. The medium according to claim 23, wherein when the super-resolution reproduction layer is irradiated with a laser beam spot, the super-resolution material contained therein changes from one crystalline phase to another at a temperature above a predetermined temperature.

26. The medium according to claim 23, wherein the high melting point material has a melting point that is sufficiently high such that the high melting point material will not be melted at least by the incident reproducing beam.

27. The medium according to claim 23, wherein a reflective coating is formed on the pits.

28. The medium according to claim 23, wherein the first and second dielectric layers control optical and/or thermal characteristics.

29. The medium according to claim 23, wherein the cover layer is formed by spin coating a resin to a thickness of approximately 0.1 mm.

30. The medium according to claim 23, wherein when the incident beam passes through the cover layer and the super-resolution reproduction layer and reaches the pits, the pits, which are smaller than the resolution limit of the incident reproducing beam, are reproduced.

31. The medium according to claim 23, wherein the medium is a BLU-ray (BD) disk.

32. A super-resolution information storage medium to be used with an information recording and/or reproducing apparatus from which an incident beam having a resolution limit determined by an objective lens is irradiated, the medium comprising:
a substrate having a first surface on which reproducing pits that are smaller than the resolution limit of the incident beam are formed and a second surface, opposite the first surface, towards which the incident beam is irradiated;
a first dielectric layer formed adjacent to the surface on which the reproducing pits are formed;
a super-resolution reproduction layer adjacent to the first dielectric layer and containing a combination of a super-resolution material and a high melting point material, the high melting point material having a higher melting point which is approximately 1,100° C. higher than the super-resolution material; and
a second dielectric layer formed adjacent to the super-resolution reproduction layer.

33. The medium according to claim 32, wherein the medium is a DVD.

34. An information storage medium to reproduce recording marks that are smaller than a resolution limit of a beam that is incident from an information recording and/or reproducing apparatus, the medium comprising:
a substrate having a surface on which reproducing pits that are smaller than the resolution limit of the incident beam are formed;
a first dielectric layer formed adjacent to the substrate;
a recording layer in which information is recorded as recording marks that are smaller than the resolution limit of the incident beam, the recording layer being formed adjacent to the first dielectric layer;
a second dielectric layer formed adjacent to the recording layer;
a super-resolution reproduction layer adjacent to the second dielectric layer and containing a combination of a super-resolution material and a high melting point material, the high melting point material having a higher melting point which is approximately 1,100° C. higher than the super-resolution material;
a third dielectric layer formed adjacent to the super-resolution layer; and
a cover layer to protect the surface on which the reproducing pits are formed, the recording layer, the super-resolution reproduction layer, and the first, second, and third dielectric layers.

35. The medium according to claim 34, wherein the recording layer comprises a magneto-optical material onto and/or from which information may be recorded and/or read using a magneto-optical mechanism.

36. The medium according to claim 34, wherein the recording layer comprises an organic material that changes reflectance in response to a beam with a predetermined power.

37. The medium according to claim 34, wherein the recording layer comprises an inorganic material that is classified into one of three groups: (1) a phase-change material that switches from one phase to another, (2) a material into which two or more materials are combined during a recording process, or (3) a material that decomposes into two or more materials during a recording process.

38. The medium according to claim 34, further comprising a plurality of recording layers.

39. The medium according to claim 34, further comprising a plurality of super-resolution layers.

40. The medium according to claim 34, wherein the substrates has a thickness that is equal or similar to that of a BLU-ray (BD) substrate so as to achieve compatibility with other types of storage media.

41. The medium according to claim 34, wherein the medium is a BLU-ray (BD) disk.

42. An information storage medium to reproduce recording marks smaller than a resolution limit of a beam that is incident from an information recording and/or reproducing apparatus, the resolution limit being determined by an objective lens of the apparatus, the medium comprising:
a substrate having a surface on which reproducing pits that are smaller than the resolution limit of the incident beam are formed and a second surface, opposite the first surface, towards which the incident beam is irradiated;
a first dielectric layer formed adjacent to the substrate;
a super-resolution reproduction layer adjacent to the first dielectric layer and containing a combination of a super-resolution material and a high melting point material, the high melting point material having a higher melting point which is approximately 1,100° C. higher than the super-resolution material;
a second dielectric layer formed adjacent to the super-resolution reproduction layer;
a recording layer in which information is recorded as recording marks that are smaller than the resolution limit of the incident beam, the recording layer being formed adjacent to the first dielectric layer; and
a third dielectric layer formed adjacent to the recording layer.

43. The medium according to claim 42, wherein the medium is a DVD.

44. An information storage medium to be used with a recording/reproducing apparatus, the medium comprising:
a 0.6 mm thick polycarbonate ROM substrate having pits with a length of 150 nm, a depth of 50 nm, and a track pitch of 0.74 μm;
a 50 nm thick $ZnS$—$SiO_2$ dielectric layer;
a 20 nm thick super-resolution reproduction layer made of Ge—Sb—Te acting as a super-resolution material and $ZnS$—$SiO_2$ acting as a high melting point material; and
a 50 nm thick $ZnS$—$SiO_2$ dielectric layer.

45. The medium according to claim 44, wherein the substrate, the dielectric layers, and the super-resolution layer are sequentially formed on the polycarbonate ROM substrate by a sputtering process.

46. The medium according to claim 44, wherein the Ge—Sb—Te and ZnS—SiO$_2$ materials are formed by co-sputtering and the volume ratio of Ge—Sb—Te to ZnS—SiO$_2$ is 1 to 1.

47. The medium according to claim 44, wherein the super-resolution reproduction layer does not melt even when the Ge—Sb—Te layer is melted so as to suppress movement of the melted Ge—Sb—Te layer.

48. A super-resolution information storage medium to be used with an information recording and/or reproducing apparatus including a signal processor, a controller, and an optical pickup from which an incident beam having a resolution limit is irradiated, the medium reflecting a beam, related to the incident beam, which is converted into an electrical signal read by the signal processor to generate servo signals used by the controller to control the optical pickup, the medium comprising:
 a read-only-memory (ROM) having a surface on which reproducing pits that are smaller than the resolution limit of the incident beam are formed;
 a first dielectric layer formed adjacent to the surface on which the reproducing pits are formed;
 a super-resolution reproduction layer adjacent to the first dielectric layer containing a combination of a super-resolution material and a high melting point material, the high melting point material having a higher melting point which is approximately 1,100° C. higher than the super-resolution material;
 a second dielectric layer formed adjacent to the super-resolution reproduction layer; and
 a cover layer to protect the surface on which the reproducing pits are formed, the super-resolution reproduction layer, and the first and second dielectric layers.

49. A super-resolution information storage medium to be used with an information recording and/or reproducing apparatus from which an incident beam having a resolution limit is irradiated, the medium comprising:
 a read-only-memory (ROM) having a surface on which reproducing pits that are smaller than the resolution limit of the incident beam are formed;
 a super-resolution reproduction layer adjacent to the first dielectric layer and containing a combination of a super-resolution material and a high melting point material, the high melting point material having a higher melting point which is approximately 1,100° C. higher than the super-resolution material; and
 a set of dielectric layers to separate the ROM surface and the super-resolution reproduction layer.

50. An information storage medium to reproduce recording marks that are smaller than a resolution limit of a beam that is incident from an information recording and/or reproducing apparatus, the medium comprising:
 a substrate having a surface on which reproducing pits that are smaller than the resolution limit of the incident beam are formed;
 a recording layer in which information is recorded as recording marks that are smaller than the resolution limit of the incident beam;
 a super-resolution reproduction layer containing a combination of a super-resolution material and a high melting point material, the high melting point material having a higher melting point which is approximately 1,100° C. higher than the super-resolution material; and
 a set of dielectric layers to separate the substrate, the recording layer, and the super-resolution layer.

* * * * *

UNITED STATES PATENT AND TRADEMARK OFFICE
CERTIFICATE OF CORRECTION

PATENT NO. : 7,442,424 B2
APPLICATION NO. : 11/119919
DATED : October 28, 2008
INVENTOR(S) : In-oh Hwang et al.

It is certified that error appears in the above-identified patent and that said Letters Patent is hereby corrected as shown below:

Column 12, line 31, insert --(S)-- after "sulfur".

Column 12, line 35, insert --material-- after "point".

Signed and Sealed this

Sixth Day of January, 2009

JON W. DUDAS
*Director of the United States Patent and Trademark Office*